Patented Mar. 9, 1937

2,073,411

UNITED STATES PATENT OFFICE 2,073,411

PROCESS OF PRODUCING THIN EGG WHITE

Arnold K. Balls, Washington, D. C., and Theodore L. Swenson, Chevy Chase, Md., dedicated to the free use of the Public of the United States of America No Drawing. Application March 6, 1934, Serial No. 714,276

3 Claims. (Cl. 99—113)

(Granted under the act of March 3, 1883, as amended April 30, 1928; 370 O. G. 757)

This application is made under the act of March 3, 1883, as amended by the act of April 30, 1928, and the invention herein described, if patented, may be manufactured and used by or for the Government for governmental purposes without the payment to us of any royalty thereon.

We hereby dedicate the invention herein described to the free use of the public in the territory of the United States of America to take effect upon the granting of a patent to us.

This invention relates to a process for rapidly thinning egg white. The whites of birds' eggs when fresh consist of a thin, easily fluid portion, and a thick and viscid portion. These portions may be more or less separated by a coarse screen, which retains the thick white, and allows the thin white to flow through. In the normal process of storing eggs the thin white increases in amount while the thick white decreases.

In certain industries, however, the thin white is more desirable than the thick white. This is true of the industry of drying egg white, where it is known that the thin white dries more readily, is more easily handled in the drier, and gives a more desirable product, in that it is more completely soluble in water than the dried whole white. In the industry it is customary to allow the whole egg white to stand for several days before drying it, in order that the change from thick to thin white may first take place.

We have found that the change from thick to thin white is a proteolysis, whereby mucin and probably other proteins of the egg are partly hydrolysed by the proteolytic ferments which occur normally in eggs. We have found that one ferment which is responsible for the hydrolysis of thick white is trypsin. The tryptic action does not progress without limit, however, because there is present in thin white an inhibitory substance which retards the breakdown of the protein.

We have further found that when the change of thick to thin white is desired, as for instance in the above mentioned industry, this may be accomplished with great advantage by the addition of a proteolytic ferment to the thick white or to the whole white. One advantage lies in the fact that the enzymically accelerated process is complete in a few hours, and thus the egg white has less opportunity to spoil.

Since the action is a simple proteolysis, any proteolytic ferment capable of operating at the pH of the egg white is suitable for the purpose. Trypsin is particularly so, but the enzymes of the papain type, and the proteinases of figs and of the melon family are also effective, though the pH of the natural egg white is not as suitable for their action as for that of trypsin. (The papainases include the cathepsin of animal tissues, the papain of papaya and the bromelin of pineapple.) It is understood that all these enzymes may be used either in their commercial forms or in any suitable preparation from their natural sources, as for example in the press-juices and water extracts of the plant or animal tissues containing them, or in more highly purified preparations which may be made by known methods. It is also possible to facilitate the action of the enzyme by adjusting the pH of the egg white or of the digestion mixture to a level near the pH optimum for the ferment employed. This may be done by adding a suitable substance with acidic properties. While it is possible to use the enzyme in the solid state, it is generally more convenient to employ the enzyme dissolved in water or suitable salt solutions.

Our invention may be applied to the disintegration of egg white in two ways: The proteolytic enzyme may be added directly to the whole egg white and the mixture maintained at a suitable temperature until the thick white has dissolved. Occasional or slow agitation is desirable in all cases.

A second method is to screen the egg white, thus removing the already thin white, and then to add the enzyme to the remaining thick white which is digested as before. The thin white may be dried at once in this case, thus further reducing the time of the operation and the chance of spoilage by bacteria and the like. After the digestion it is frequently desirable to screen out or otherwise remove undigested particles of the chalazae and other membranes, which, however, form a small part of the total egg white.

In applying our invention it is necessary to gauge the amount of enzyme and the time with regard to the egg white being processed and the temperature at which the digestion is conducted.

In digesting the whites of hens' eggs, it is usually sufficient to use one part of U. S. P. trypsin to about five thousand parts of egg white by weight. When the thick white alone is treated, by the second method, less trypsin is required since the inhibitory substance already in the thin white has been removed from the digestion mixture. The time required for the process depends on the amount of enzyme and the temperature. In the example above given with whole egg white digestion is usually complete in 8 to 10 hours at 30° C. and in about half that time at 38° C. At lower temperatures than 30° C. the digestion is slow, but temperatures as high as 40° may be used safely with trypsin. With papain and bromelin the maximum temperature is determined more by the coagulation point of the egg white than by the destruction of the enzyme. Temperatures of 50° C. may be used.

In further explanation and elaboration of the temperature lower than 30° C. referred to above, applicants have found in the use of trypsin, that liquefaction takes place below such temperature, although not so rapidly as at the higher temperatures. The product obtained at this lower temperature is better for the reason that it is practically free from microbial growth and it also contains appoximately the same amount of glucose (the sugar normally present in egg white), as is found in fresh egg white.

Having fully disclosed our discovery we claim:

1. The process of treating fresh egg white which comprises mixing a proteolytic enzyme with the fresh egg white, maintaining the mixture at a temperature favorable to the enzyme action until the thick portion of the egg white is thinned to a desired consistency.

2. The process of thinning fresh egg white which comprises mixing trypsin with the fresh egg white, in the proportion of one part trypsin to five thousand parts of egg white by weight, and maintaining the resulting product for a period of from 8 to 10 hours at a temperature of approximately 30° C.

3. The process of thinning fresh egg white which comprises mixing trypsin with the egg white, in the proportion of one part trypsin to five thousand parts of fresh egg white by weight, and maintaining the resulting product for a period of 4 to 5 hours at a temperature of approximately 38° C.

ARNOLD K. BALLS.
THEODORE L. SWENSON.